United States Patent
Oag et al.

(10) Patent No.: US 12,001,119 B2
(45) Date of Patent: Jun. 4, 2024

(54) FLEXIBLE LIQUID CRYSTAL-CONTAINING LENSES

(71) Applicant: CooperVision International Limited, Fareham (GB)

(72) Inventors: Robert Oag, Southampton (GB); Roger Brian Minchin Clarke, Cambridge (GB); Mikhail Bashtanov, Cambridge (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 17/951,132

(22) Filed: Sep. 23, 2022

(65) Prior Publication Data
US 2023/0119885 A1    Apr. 20, 2023

Related U.S. Application Data

(60) Provisional application No. 63/257,144, filed on Oct. 19, 2021.

(51) Int. Cl.
| | |
|---|---|
| *G02F 1/29* | (2006.01) |
| *G02C 7/04* | (2006.01) |
| *G02C 7/08* | (2006.01) |

(52) U.S. Cl.
CPC ............ *G02F 1/294* (2021.01); *G02C 7/041* (2013.01); *G02C 7/083* (2013.01); *G02C 2202/16* (2013.01); *G02C 2202/20* (2013.01)

(58) Field of Classification Search
None
See application file for complete search history.

(56) References Cited

U.S. PATENT DOCUMENTS

| | | | | |
|---|---|---|---|---|
| 4,904,063 A | * | 2/1990 | Okada | ........................ G02F 1/29 349/200 |
| 8,523,354 B2 | * | 9/2013 | Haddock | .......... B29D 11/00028 349/201 |

(Continued)

FOREIGN PATENT DOCUMENTS

| | | |
|---|---|---|
| CN | 110300916 A | 10/2019 |
| EP | 3048472 A1 | 7/2016 |

(Continued)

OTHER PUBLICATIONS

Combined Search and Examination Report issued in corresponding United Kingdom Patent Application GB2214205.3 dated Mar. 28, 2023 (7 pages).

(Continued)

*Primary Examiner* — Ryan Crockett
(74) *Attorney, Agent, or Firm* — Kilyk & Bowersox, P.L.L.C.

(57) ABSTRACT

An electrically-switchable flexible contact lens for conforming to an eye of a user is provided. The lens comprises a liquid crystal cell for changing a focal power of the contact lens, and the liquid crystal cell has a cell gap thickness between a first inner surface and a second inner surface, the liquid crystal cell comprising a diffractive optical element for correcting the vision of a user, wherein the diffractive optical element is arranged to maintain the cell gap thickness by providing support at one or more locations within the cell.

13 Claims, 5 Drawing Sheets

(56) References Cited

U.S. PATENT DOCUMENTS

| | | | |
|---|---|---|---|
| 9,500,882 B2* | 11/2016 | Pugh | G02F 1/1334 |
| 11,531,216 B2 | 12/2022 | Kubota et al. | |
| 2007/0182915 A1 | 8/2007 | Osawa et al. | |
| 2008/0208335 A1* | 8/2008 | Blum | A61F 2/1627 |
| | | | 623/6.22 |
| 2013/0222756 A1* | 8/2013 | Van Heugten | G02B 5/1828 |
| | | | 349/200 |
| 2016/0170097 A1* | 6/2016 | Milton | G02C 7/041 |
| | | | 349/200 |
| 2018/0231801 A1 | 8/2018 | Gutierrez et al. | |
| 2018/0284480 A1 | 10/2018 | De Sio et al. | |
| 2019/0049784 A1* | 2/2019 | Lin | G02F 1/133526 |
| 2020/0201112 A1* | 6/2020 | De Smet | G02F 1/133526 |
| 2021/0318589 A1* | 10/2021 | Van Heugten | G02C 7/083 |

FOREIGN PATENT DOCUMENTS

| | | |
|---|---|---|
| EP | 3581989 A1 | 12/2019 |
| KR | 20180043161 A | 4/2018 |
| TW | 200622407 A | 7/2006 |
| WO | 2009005822 A1 | 1/2009 |
| WO | 2012061411 A1 | 5/2012 |
| WO | WO2017136310 A1 | 8/2017 |
| WO | 2022162350 A1 | 8/2022 |
| WO | 2022189426 A1 | 9/2022 |

OTHER PUBLICATIONS

International Search Report and Written Opinion issued in corresponding International Patent Application No. PCT/GB2022/052454 dated Nov. 17, 2022 (12 pages).

PCT Demand filed Jan. 18, 2023 in corresponding International Patent Application No. PCT/GB2022/052454 (19 pages).

Second Written Opinion issued in corresponding International Patent Application No. PCT/GB2022/052454 mailed Apr. 21, 2023 (7 pages).

Response to Second Written Opinion filed Jun. 19, 2023 in corresponding International Patent Application No. PCT/GB2022/052454 (17 pages).

Office Action issued in corresponding Taiwan Patent Application 111137151 issued Aug. 18, 2023 (with English translation)(28 pages).

International Preliminary Report on Patentability issued in corresponding International Patent Application No. PCT/GB2022/052454 dated Feb. 2, 2024 (7 pages).

\* cited by examiner

FLEXIBLE LIQUID CRYSTAL-CONTAINING LENSES

This application claims the benefit under 35 U.S.C. § 119(e) of prior U.S. Provisional Patent Application No. 63/257,144, filed Oct. 19, 2021, which is incorporated in its entirety by reference herein.

FIELD

The present invention relates to flexible contact lenses.

The present invention concerns flexible contact lenses. More particularly, but not exclusively, this invention concerns an electrically-switchable contact lens.

BACKGROUND

Flexible contact lenses comprising diffractive optical elements are known. The lenses may be provided with liquid crystal, which is electrically-switchable between two states. In a first state, the refractive index of the liquid crystal does not match the refractive index of the diffractive optical element and the diffractive optical element interacts with, and diffracts, the light. In a second state, the refractive index of the liquid crystal matches that of the diffractive optical element and there is no or very little diffraction of incident light.

The present invention seeks to provide an improved flexible contact lens comprising a diffractive optical element.

SUMMARY

According to a first aspect of the present invention, there is provided an electrically-switchable flexible contact lens having the features set-out as described herein.

According to a second aspect of the present invention, there is provided an electrically-switchable flexible contact lens having the features set-out as described herein.

According to a third aspect of the present invention, there is provided an electrically-switchable flexible contact lens having the features set-out as described herein.

According to a fourth aspect of the present invention, there is provided an electrically-switchable flexible contact lens having the features set-out as described herein.

According to a fifth aspect of the present invention, there is provided an electrically-switchable flexible contact lens having the features set-out as described herein.

According to a sixth aspect of the present invention, there is provided an electrically-switchable flexible contact lens having the features set-out as described herein.

According to a seventh aspect of the present invention, there is provided an electrically-switchable flexible contact lens having the features set-out as described herein.

Preferred, but optional, features of the present invention are set-out below and as claimed.

It will, of course, be appreciated that features described in relation to one aspect of the present invention may be incorporated into other aspects.

BRIEF DESCRIPTION OF DRAWINGS

Embodiments of the present invention will now be described by way of example only with reference to the accompanying schematic drawings of which.

DETAILED DESCRIPTION

Figure 1:
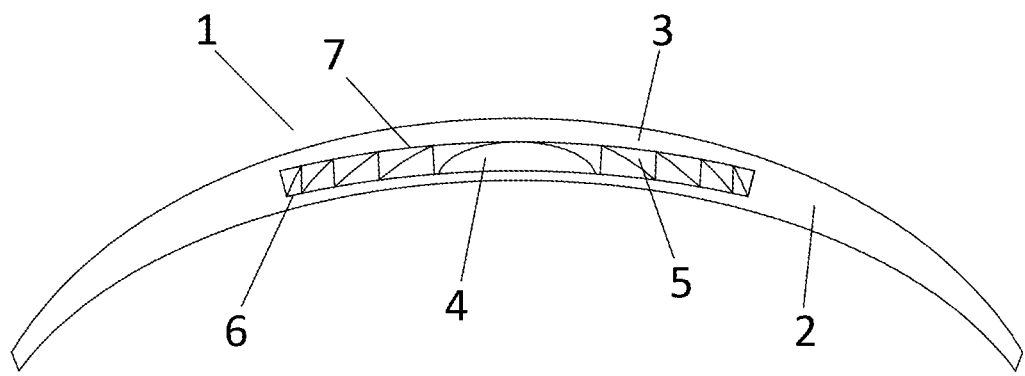
FIG. 1 shows a schematic side-on cutaway view of an example of a contact lens in accordance with a first aspect of the present invention, the contact lens comprising a liquid crystal cell.

The present invention provides, in accordance with a first aspect of the present invention, an electrically-switchable flexible contact lens for conforming to an eye of a user, the lens comprising:

a first liquid crystal cell for changing a focal power of the contact lens, and having a cell gap thickness between a first inner surface and a second inner surface, the first liquid crystal cell comprising a diffractive optical element for correcting the vision of a user, wherein the diffractive optical element is arranged to maintain the cell gap thickness by providing support at one or more locations within the cell.

The applicant has discovered that it is possible to use a diffractive optical element as a spacer to maintain a cell gap thickness in a flexible ophthalmic lens.

The maintenance of cell gap thickness is important to maintaining the optical properties of the ophthalmic lens. In particular, the maintenance of the cell gap thickness maintains a small enough cell gap that the liquid crystal can align without haze. In this connection, maintenance of cell gap thickness may comprise a mean reduction of cell gap thickness across the first liquid crystal cell of no more than 15%, optionally no more than 12%, optionally no more than 10%, optionally no more than 8% and optionally no more than 5%. Maintenance of the cell gap thickness may only permit a relatively small reduction and/or increase in cell gap thickness. In this connection, the mean change in cell gap thickness across the first liquid crystal cell may optionally be no more than 15%, optionally no more than 12%, optionally no more than 10%, optionally no more than 8% and optionally no more than 5% when the ophthalmic lens is deformed by being placed on the eye of a user.

The mean cell gap thickness in an undeformed lens is optionally at least 2.0 microns, optionally at least 3.0 microns, optionally at least 3.5 microns, optionally at least 4.0 microns, optionally at least 4.5 microns and optionally at least 5.0 microns.

The mean cell gap thickness in an undeformed lens is optionally no more than 7.0 microns, optionally no more than 6.5 microns, optionally no more than 6.0 microns, optionally no more than 5.5 microns, optionally no more than 5.0 microns, optionally no more than 4.5 microns, and optionally no more than 4.0 microns.

As used herein, and as understood by persons skilled in the art, micron is the same as micrometer.

The mean cell gap thickness in an undeformed lens is optionally from 2.0 microns to 7.0 microns, optionally from 2.5 microns to 5.5 microns, optionally from 3.5 microns to 5.0 microns and optionally from 3.5 microns to 4.5 microns.

The mean height of the diffractive optical element may correspond to the mean cell gap thickness. Similarly, the height of the diffractive element at a point in the first liquid crystal cell may correspond to the cell gap thickness at that point in the first liquid crystal cell.

The first liquid crystal cell may be substantially devoid of other elements (such as spacers) for maintaining the cell gap thickness by providing support at locations within the cell. Optionally, however, a perimeter spacer may be provided at the perimeter of the first liquid crystal cell, in addition to the diffractive optical element.

For the avoidance of doubt, a diffractive optical element is one the features of which are of a size and scale small enough relative to the wavelengths of the light impinging on it so as to cause controlled and desired optical effects that result solely from the diffraction of light. For the avoidance of doubt, diffractive optical elements do not include Fresnel lenses.

The first liquid crystal cell may be operable between a first, unswitched state and a second, switched state. In the first state, the difference in the effective refractive index of the liquid crystal and the refractive index of the diffractive optical element may be greater than, or lower than, in the second state. In the first state or the second state, the difference in the effective refractive index of the liquid crystal and the refractive index of the diffractive optical element may be small or nil, i.e., the effective refractive index of the liquid crystal and the diffractive optical element may be approximately the same. In this context, the difference in the effective refractive index of the liquid crystal and the refractive index of the diffractive optical element may optionally be no more than 0.03, optionally no more than 0.02 and optionally no more than 0.01. Such differences in refractive index are to be calculated for a wavelength in the visible part of the electromagnetic spectrum (radiation with a wavelength of from 450 to 700 nm). Such differences in refractive index may be calculated at a wavelength of 450 nm, and optionally at a wavelength 700 nm. Optionally, such differences may be calculated at a plurality of wavelengths from 450 nm to 700 nm. In the other of the first and second state, the effective refractive index of the liquid crystal and the refractive index of the diffractive optical element do not match, and therefore the diffractive optical element diffracts incident light. The first state may be an unswitched state, i.e., with no or a low voltage applied to the first liquid crystal cell. The second state may be a switched state, i.e., with a voltage applied that switches the liquid crystal in the cell into the second state.

For the avoidance of doubt, the effective refractive index is the refractive index of the liquid crystal for light normally incident on the contact lens and on the first liquid crystal cell. In the first, unswitched state, the effective refractive index may be $n_{ave}=0.5(n_o+n_e)$, where $n_o$ is the ordinary refractive index of the liquid crystal and $n_e$ is the extraordinary refractive index of the liquid crystal. In the second, switched state, the effective refractive index may be $n_o$.

For the avoidance of doubt, "for correcting the vision of a user" comprises being suitable for correcting the near, far, and/or intermediate vision of a user.

The maximum height of the diffractive optical element need not be the same across the diffractive optical element. For example, the diffractive optical element may comprise an inner portion and an outer portion. The maximum height of the diffractive optical element at the outer portion may be greater than the maximum height of the diffractive optical element at the inner portion. The maximum height of the diffractive optical element at the outer portion may be up to 20% greater than the maximum height of the diffractive optical element at the inner portion, optionally up to 15% greater, optionally up to 10% greater, optionally up to 7.5% greater, optionally up to 5% greater, optionally up to 2.5% greater and optionally up to 1% greater. The height of the diffractive optical element is typically the height along the optical axis.

The maximum height of the diffractive optical element at the outer portion may be at least 1% greater than the maximum height of the diffractive optical element at the inner portion, optionally at least 2% greater, optionally at least 3% greater, optionally at least 4% greater, optionally at least 5% greater, optionally at least 6% greater, optionally at least 7% greater, optionally at least 8% greater, optionally at least 10% greater, optionally at least 12.5% greater, optionally at least 15% greater and optionally at least 20% greater than the maximum height of the diffractive optical element at the inner portion.

The inner portion may be at, or proximate, the centre of the diffractive optical element.

The height of the diffractive optical element may increase with distance from the centre of the diffractive optical element. The height of the diffractive optical element may increase linearly with distance from the centre of the diffractive optical element. The height of the diffractive optical element may increase sub-linearly with distance from the centre of the diffractive optical element. The height of the diffractive optical element may increase super-linearly with distance from the centre of the diffractive optical element.

At least a portion of the diffractive optical element may be attached to the first surface and at least a portion of the diffractive optical element may be attached to the second surface.

As mentioned above, the diffractive optical element may comprise a plurality of peaks and troughs, optionally annular peaks and troughs. The outer portion may comprise an outer peak, for example, optionally one of the ten outermost peaks, optionally one of the eight outermost peaks, optionally one of the five outermost peaks and optionally one of the three outermost peaks. The outer portion may comprise the outermost peak. The height of the peaks may increase with distance from the centre of the diffractive optical element. The height of the peaks may increase linearly with distance from the centre of the diffractive optical element. The height of the peaks may increase sub-linearly with distance from the centre of the diffractive optical element. The height of the peaks may increase super-linearly with distance from the centre of the diffractive optical element.

At least a portion of a peak may be attached to the second surface.

The liquid crystal may comprise a cholesteric liquid crystal. In an unswitched state, a director of the liquid crystal adjacent the first and/or second inner surfaces may optionally be at an angle of no more than 20 degrees, optionally no more than 15 degrees, optionally no more than 10 degrees, optionally no more than 8 degrees, optionally no more than 5 degrees and optionally no more than 3 degrees to the first and second inner surfaces. In an unswitched state, a director of the liquid crystal remote from the first and second inner surfaces (and optionally midway between the first and second inner surfaces) may optionally be at an angle of no more than 20 degrees, optionally no more than 15 degrees, optionally no more than 10 degrees, optionally no more than 8 degrees, optionally no more than 5 degrees and optionally no more than 3 degrees to the first and second inner surfaces. In a switched state, a director of the liquid crystal remote from the first and second inner surfaces (and optionally midway between the first and second inner surfaces) may be at an angle of at least 60 degrees, optionally at least 70 degrees, optionally at least 80 degrees and optionally at least 85 degrees to the first and second inner surfaces.

The refractive index of the diffractive optical element may optionally be at least 1.40, optionally at least 1.42, optionally at least 1.44, optionally at least 1.46 and optionally at least 1.48.

The refractive index of the diffractive optical element may optionally be no more than 1.72, optionally no more than 1.70, optionally no more than 1.68, optionally no more than 1.66 and optionally no more than 1.64.

For example, the refractive index of the diffractive optical element may be from 1.40 to 1.72, preferably 1.42 to 1.70, and more preferably, 1.44 to 1.68.

The contact lens may comprise a further optical element for correcting the vision of a user. In this connection, the contact lens may comprise a lens body for correcting the vision of a user. The lens body may provide a positive optical power, such as +0.5, +1.0 or +1.5 D. The optical power of the lens body may be fixed. The addition of such a lens body may be particularly useful if the effective refractive index of the liquid crystal matches the refractive index of the diffractive optical element when the first liquid crystal cell is in the second, switched state.

At both 450 nm and 700 nm, a refractive index of the liquid crystal is optionally 0.80 to 1.20 times the refractive index of the diffractive optical element. At both 450 nm and 700 nm, said refractive index of the liquid crystal may be 0.90 to 1.10 times the refractive index of the diffractive optical element. At both 450 nm and 700 nm, said refractive index of the liquid crystal may be 0.95 to 1.05 times the refractive index of the diffractive optical element. At both 450 nm and 700 nm, said refractive index of the liquid crystal may be 0.97 to 1.03 times the refractive index of the diffractive optical element. At both 450 nm and 700 nm, said refractive index of the liquid crystal may be 0.98 to 1.02 times the refractive index of the diffractive optical element.

Said refractive index of the liquid crystal at 500 nm may be 0.80 to 1.20 times the refractive index of the diffractive optical element, optionally 0.90 to 1.10 times, optionally 0.95 to 1.05 times, optionally 0.97 to 1.03 times and optionally 0.98 to 1.02 times the refractive index of the diffractive optical element.

Said refractive index of the liquid crystal is the average refractive index $n_{ave}$, calculated thus: $n_{ave}=0.5(n_e+n_o)$, where $n_e$ is the extraordinary refractive index and $n_o$ is the ordinary refractive index.

The first liquid crystal cell may comprise a cholesteric liquid crystal, and the refractive index of the diffractive optical element is optionally no more than 1.57.

The first liquid crystal cell may comprise a cholesteric liquid crystal, and the refractive index of the diffractive optical element is optionally at least 1.58.

The diffractive optical element may comprise a plurality of peaks and troughs, optionally annular peaks and troughs. The peaks and troughs may be concentric. At least one, optionally more than one, and optionally each of the peaks maintain the cell gap thickness by providing support at one or more locations within the cell.

The diffractive optical element may comprise at least 5 peaks, optionally at least 7 peaks, and optionally at least 10 peaks. The diffractive optical element may optionally comprise no more than 20 peaks, optionally no more than 15 peaks and optionally no more than 10 peaks.

The contact lens may comprise more than one liquid crystal cell. For example, the contact lens may comprise a second liquid crystal cell. The first and second liquid crystal cells may be arranged so that light passes through both liquid crystal cells before passing into the eye of the wearer. The second liquid crystal cell may comprise those features described above in relation to the first aspect of the present invention. For example, the second liquid crystal cell may comprise a diffractive optical element that acts as a spacer in the second liquid crystal cell.

According to a second aspect of the invention there is also provided an electrically-switchable flexible contact lens for conforming to an eye of a user, the lens comprising:

a first liquid crystal cell for changing a focal power of the contact lens, and having a cell gap thickness between a first inner surface and a second inner surface;

the first liquid crystal cell comprising a diffractive optical element for correcting the vision of a user, the diffractive optical element comprising an inner portion and an outer portion, the maximum height of the diffractive optical element at the outer portion being from 1% to 20% greater than the maximum height of the diffractive optical element at the inner portion.

The applicant has discovered that it is advantageous for the maximum height of a diffractive optical element to be greater at an outer part of the first liquid crystal cell than at an inner part of the first liquid crystal cell, but that the difference in maximum height should be limited. In particular, the applicant has discovered that such an arrangement of the diffractive optical element may compensate for the curvature of the cornea when the contact lens is placed on the cornea. Furthermore, such an arrangement of the diffractive optical element may help improve "straight ahead viewing", particularly at the edge of a lens comprising a diffractive optical element. This arrangement of the diffractive optical element helps to ensure that the optical path of light at the edge of the diffractive optical element is approximately the same as the optical path of light at the centre of the diffractive optical element.

The height of the diffractive optical element is typically the height along the optical axis.

The maximum height is typically measured locally, i.e., relative to a base or bottom of the diffractive optical element.

The maximum height of the diffractive optical element at the outer portion may be up to 15% greater, optionally up to 10% greater, optionally up to 7.5% greater, optionally up to 5% greater and optionally up to 2.5% greater than the maximum height of the diffractive optical element at the inner portion.

The maximum height of the diffractive optical element at the outer portion may be at least 2% greater, optionally at least 3% greater, optionally at least 4% greater, optionally at least 5% greater, optionally at least 6% greater, optionally at least 7% greater, optionally at least 8% greater, optionally at least 10% greater, optionally at least 12.5% greater and optionally at least 15% greater than the maximum height of the diffractive optical element at the inner portion.

The height of the diffractive optical element may increase with distance from the centre of the diffractive optical element. The height of the diffractive optical element may increase linearly with distance from the centre of the diffractive optical element. The height of the diffractive optical element may increase sub-linearly with distance from the centre of the diffractive optical element. The height of the diffractive optical element may increase super-linearly with distance from the centre of the diffractive optical element.

The inner portion may be at, or proximate, the centre of the diffractive optical element.

The diffractive optical element may extend over a chord length, r. The inner portion may comprise the portion of diffractive optical element within a cord length of r/8 from a centre of the diffractive optical element. The outer portion may comprise the portion of diffractive optical element having a chord length of from r/4 (and optionally from 3 r/8) to r/2.

The diffractive optical element may comprise a plurality of peaks and troughs, optionally annular peaks and troughs. The outer portion may comprise an outer peak, for example, optionally one of the ten outermost peaks, optionally one of the eight outermost peaks, optionally one of the five outermost peaks and optionally one of the three outermost peaks. The outer portion may comprise the outermost peak. The height of the peaks may increase with distance from the centre of the diffractive optical element. The height of the peaks may increase linearly with distance from the centre of the diffractive optical element. The height of the peaks may increase sub-linearly with distance from the centre of the diffractive optical element. The height of the peaks may increase super-linearly with distance from the centre of the diffractive optical element.

The liquid crystal may comprise a cholesteric liquid crystal. In an unswitched state, a director of the liquid crystal remote from the first inner surface and the second inner surface (and optionally midway between the first and second inner surfaces) may optionally be at an angle of no more than 20 degrees, optionally no more than 15 degrees, optionally no more than 10 degrees, optionally no more than 8 degrees, optionally no more than 5 degrees and optionally no more than 3 degrees to the first and second inner surfaces. In a switched state, a director of the liquid crystal remote from the first and second inner surfaces (and optionally midway between the first and second inner surfaces) may be at an angle of at least 60 degrees, optionally at least 70 degrees, optionally at least 80 degrees and optionally at least 85 degrees to the first and second inner surfaces.

The mean cell gap thickness in an undeformed lens is optionally at least 2.0 microns, optionally at least 3.0 microns, optionally at least 3.5 microns, optionally at least 4.0 microns, optionally at least 4.5 microns, and optionally at least 5.0 microns.

The mean cell gap thickness in an undeformed lens is optionally no more than 7.0 microns, optionally no more than 6.5 microns, optionally no more than 6.0 microns, optionally no more than 5.5 microns, optionally no more than 5.0 microns, optionally no more than 4.5 microns, and optionally no more than 4.0 microns.

The mean cell gap thickness in an undeformed lens is optionally from 2.0 microns to 7.0 microns, optionally from 2.5 microns to 5.5 microns, optionally from 3.5 microns to 5.0 microns and optionally from 3.5 microns to 4.5 microns.

The contact lens of the second aspect of the present invention may comprise any of the features of the contact lens of the first aspect of the present invention.

In accordance with a third aspect of the present invention, there is provided an electrically-switchable flexible contact lens for conforming to an eye of a user, the lens comprising:
  a first liquid crystal cell for changing a focal power of the contact lens, and having a cell gap thickness between a first inner surface and a second inner surface,
  the first liquid crystal cell comprising a diffractive optical element for correcting the vision of a user, and a cholesteric liquid crystal,
  the first liquid crystal cell being operable between a first, unswitched state and a second, switched state, wherein in the first state, the difference in the effective refractive index of the liquid crystal and the refractive index of the diffractive optical element is greater than or lower than in the second state,
  wherein at both 450 nm and 700 nm, the average refractive index of the liquid crystal is 0.80 to 1.20 times the refractive index of the diffractive optical element,
  the average refractive index of the liquid crystal being $n_{ave}$, calculated thus: $n_{ave}=0.5(n_e+n_o)$, where $n_e$ is the extraordinary refractive index and $n_o$ is the ordinary refractive index.

The applicant has discovered that it is advantageous for the average refractive index of the liquid crystal to be similar to that of the diffractive optical element in the visible part of the electromagnetic spectrum.

Said average refractive index of the liquid crystal and the refractive index of the diffractive optical element may be determined at ambient temperature, for example, 20° C. or 25° C., or at a temperature corresponding to that of the human body (about 37° C.), or at a temperature corresponding to that of a cornea of an eye (about 34° C.).

At both 450 nm and 700 nm, said average refractive index of the liquid crystal may be 0.90 to 1.10 times the refractive index of the diffractive optical element. At both 450 nm and 700 nm, said average refractive index of the liquid crystal may be 0.95 to 1.05 times the refractive index of the diffractive optical element. At both 450 nm and 700 nm, said average refractive index of the liquid crystal may be 0.97 to 1.03 times the refractive index of the diffractive optical element. At both 450 nm and 700 nm, said average refractive index of the liquid crystal may be 0.98 to 1.02 times the refractive index of the diffractive optical element.

Said average refractive index of the liquid crystal at 500 nm may be 0.80 to 1.20 times the refractive index of the diffractive optical element, optionally 0.90 to 1.10 times, optionally 0.95 to 1.05 times, optionally 0.97 to 1.03 times and optionally 0.98 to 1.02 times the refractive index of the diffractive optical element.

Said average refractive index of the liquid crystal is the average refractive index $n_{ave}$, calculated thus: $n_{ave}=0.5(n_e+n_o)$, where $n_e$ is the extraordinary refractive index and $n_o$ is the ordinary refractive index.

At 460 nm, 480 nm, 500 nm, 520 nm, 540 nm, 560 nm, 580 nm, 600 nm, 620 nm, 640 nm, 660 nm and 680 nm, a refractive index of the liquid crystal is optionally 0.80 to 1.20 times the refractive index of the diffractive optical element, optionally 0.90 to 1.10 times the refractive index of the diffractive optical element, optionally 0.95 to 1.05 times, optionally 0.97 to 1.03 times and optionally 0.98 to 1.02 times the refractive index of the diffractive optical element.

At substantially all wavelengths from 450 nm to 700 nm, a refractive index of the liquid crystal is optionally 0.80 to 1.20 times the refractive index of the diffractive optical element. At substantially all wavelengths from 450 nm to 700 nm, the refractive index of the liquid crystal may be 0.90 to 1.10 times the refractive index of the diffractive optical element, optionally 0.95 to 1.05 times, optionally 0.97 to 1.03 times and optionally 0.98 to 1.02 times the refractive index of the diffractive optical element. Those skilled in the art will realise that it is not necessary to measure the refractive indices at all wavelengths; refractive index varies with wavelength in a similar manner for most materials. Typically, refractive index reduces from 450 nm to 700 nm in a continuous manner, with no minima, maxima or points of inflexion.

The first liquid crystal cell may be operable between the first and the second states. In the first state (typically an unswitched state), a director of the liquid crystal remote from the first and second inner surfaces (and optionally midway between the first and second inner surfaces) may at an angle of no more than 20 degrees, optionally no more than 15 degrees, optionally no more than 10 degrees, optionally no more than 8 degrees, optionally no more than 5 degrees and optionally no more than 3 degrees to the first and second inner surfaces. In a switched state (for example, the second state), a director of the liquid crystal remote from the first and second inner surfaces (and optionally midway between the first and second inner surfaces) may be at an angle of at least 60 degrees, optionally at least 70 degrees, optionally at least 80 degrees and optionally at least 85 degrees to the first and second inner surfaces.

The lens of the third aspect of the present invention may comprise any of the features of the lens of the first and/or second aspects of the present invention.

In accordance with a fourth aspect of the present invention, there is provided an electrically-switchable flexible contact lens for conforming to an eye of a user, the lens comprising:
  a first liquid crystal cell for changing a focal power of the contact lens, and having a cell gap thickness between a first inner surface and a second inner surface,
  the first liquid crystal cell comprising a diffractive optical element for correcting the vision of a user, and a cholesteric liquid crystal;
  the first liquid crystal cell being operable between a first, unswitched state and a second, switched state, wherein in the first state, the difference in the effective refractive index of the liquid crystal and the refractive index of the diffractive optical element is greater or less than in the second state,
  wherein the refractive index of the diffractive optical element is no more than 1.57.

The applicant has discovered that the optical performance of a contact lens shows good refractive index matching in the second state with good near field performance over a wide wavelength range if the refractive index of the diffractive optical element is relatively low.

In the first state or second state, but preferably the second state, the difference in the effective refractive index of the liquid crystal and the refractive index of the diffractive optical element may be small or nil, i.e., the refractive indices of the liquid crystal and the diffractive optical element are approximately the same. In the second state, because of the matching of the refractive indices, the diffractive element does not significantly diffract incident light.

In the first state or the second state, but preferably the first state, the difference in the effective refractive index of the liquid crystal and the refractive index of the diffractive optical element may be greater than in the other state, so that the diffractive optical element diffracts incident light.

In the first, unswitched state, the effective refractive index of the liquid crystal may be the average refractive index of the liquid crystal, $n_{ave}=0.5(n_e+n_o)$, where $n_e$ is the extraordinary refractive index and $n_o$ is the ordinary refractive index. In the second, switched state, the effective refractive index of the liquid crystal may be $n_o$, the ordinary refractive index.

The contact lens may comprise a lens body for correcting the vision of a user. The lens body may provide a positive optical power, such as +0.5, +1.0 or +1.5 D. The optical power of the lens body may be fixed. The lens body may be located at or near the uppermost portion of the lens, the portion facing away from the portion of the lens that contacts the eye of a wearer. The addition of such a lens body may be particularly useful if the effective refractive index of the liquid crystal matches the refractive index of the diffractive optical element when the first liquid crystal cell is in the second, switched state.

The refractive index of the diffractive optical element is optionally no more than 1.55 and optionally no more than 1.53.

The refractive index of the diffractive optical element is optionally at least 1.43, optionally at least 1.45, optionally at least 1.47 and optionally at least 1.49.

The refractive index of the diffractive optical element is optionally from 1.43 to 1.57, optionally from 1.45 to 1.55 and optionally from 1.47 to 1.55.

A director of the liquid crystal remote from the first and second inner surfaces (optionally midway between the first and second inner surfaces), in an unswitched state, may at an angle of no more than 20 degrees, optionally no more than 15 degrees, optionally no more than 10 degrees, optionally no more than 8 degrees, optionally no more than 5 degrees and optionally no more than 3 degrees to the first and second inner surfaces. In a switched state, a director of the liquid crystal remote from the first and second inner surfaces (and optionally midway between the first and second inner surfaces) may be at an angle of at least 60 degrees, optionally at least 70 degrees, optionally at least 80 degrees and optionally at least 85 degrees to the first and second inner surfaces.

The lens of the fourth aspect of the present invention may comprise any of the features of the lens of the first, second and/or third aspects of the present invention.

In accordance with a fifth aspect of the present invention, there is provided an electrically-switchable flexible contact lens for conforming to an eye of a user, the lens comprising:
a first liquid crystal cell for changing a focal power of the contact lens, and having a cell gap thickness between a first inner surface and a second inner surface,
the first liquid crystal cell comprising a diffractive optical element for correcting the vision of a user, and a cholesteric liquid crystal;
the first liquid crystal cell being operable between a first, unswitched state and a second, switched state, wherein in the first state, the difference in the effective refractive index of the liquid crystal and the refractive index of the diffractive optical element is greater or lower than in the second state, wherein the refractive index of the diffractive optical element is at least 1.58.

The applicant has discovered that the optical performance of the lens shows less sensitivity to different wavelengths in the first state if the refractive index of the diffractive optical element is relatively high.

In the first or second state (but preferably the first state), the difference in the effective refractive index of the liquid crystal and the refractive index of the diffractive optical element may be small or nil, i.e., the refractive indices of the liquid crystal and the diffractive optical element are approximately the same. In the first state, because of the matching of the refractive indices, the diffractive element does not significantly diffract incident light. In the first state or the second state, but preferably the second state, the difference in the effective refractive index of the liquid crystal and the refractive index of the diffractive optical element may be greater than in the other state, so that the diffractive optical element diffracts incident light, and contributes to the optical power of the contact lens.

In the first, unswitched state, the effective refractive index of the liquid crystal may be the average refractive index of the liquid crystal, $n_{ave}=0.5(n_e+n_o)$, where $n_e$ is the extraordinary refractive index and $n_o$ is the ordinary refractive index. In the second, switched state, the effective refractive index of the liquid crystal may be $n_o$, the ordinary refractive index.

The refractive index of the diffractive optical element is optionally at least 1.58, optionally at least 1.60, optionally at least 1.62, optionally at least 1.64 and optionally at least 1.66.

The refractive index of the diffractive optical element is optionally no more than 1.70, optionally no more than 1.68 and optionally no more than 1.66.

The refractive index of the diffractive optical element is optionally from 1.58 to 1.70, optionally from 1.60 to 1.68 and optionally from 1.62 to 1.66.

In an unswitched state, a director of the liquid crystal remote from the first and second inner surfaces, and optionally midway between the first and second inner surfaces, may at an angle of no more than 20 degrees, optionally no more than 15 degrees, optionally no more than 10 degrees, optionally no more than 8 degrees, optionally no more than 5 degrees and optionally no more than 3 degrees to the first and second inner surfaces. In a switched state, a director of the liquid crystal remote from the first and second inner surfaces, and optionally midway between the first and second inner surfaces, may be at an angle of at least 60 degrees, optionally at least 70 degrees, optionally at least 80 degrees and optionally at least 85 degrees to the first and second inner surfaces.

In accordance with a sixth aspect, there is provided an electrically-switchable flexible contact lens for conforming to an eye of a user, the lens comprising:
a first liquid crystal cell for changing a focal power of the contact lens, and having a cell gap thickness between a first inner surface and a second inner surface,
the first liquid crystal cell comprising a diffractive optical element for correcting the vision of a user,
the diffractive optical element comprising a plurality of peak and troughs, the peaks extending in a direction from the first inner surface to the second inner surface,
at least a portion of at least one peak being attached to the second inner surface.

Attachment of at least one peak of the diffractive optical element to the second inner surface may limit movement of the liquid crystal within the cell, which movement may be undesirable.

The diffractive optical element may be arranged to maintain the cell gap thickness by providing support at one or more locations within the cell.

The diffractive optical element may comprise a central peak and a plurality of outer peaks, at least a portion of at least one of the outer peaks being attached to the second inner surface.

At least one, optionally more than one and optionally each of the outer peaks may be annular. More than one and optionally all of the outer peaks may be concentric.

At least a majority of, and substantially all of, at least one peak may be attached to the second surface. Such an arrangement inhibits passages of liquid crystal past the peak in the event that the first liquid crystal cell is deformed.

Substantially all of each of more than one peak may be attached to the second inner surface.

Each peak may be attached to the second inner surface. Substantially all of each peak may be attached to the second inner surface.

Attachment of a peak to the second inner surface may be achieved, for example, using an adhesive. Alternatively, at least one of the peaks and the second inner surface may be provided with a meltable polymer that attaches the peak and second inner surface when heated and cooled.

In accordance with a seventh aspect of the present invention, there is provided an electrically-switchable flexible contact lens for conforming to an eye of a user, the lens comprising:
a first liquid crystal cell for changing a focal power of the contact lens, and having a cell gap thickness between a first inner surface and a second inner surface,
the first liquid crystal cell comprising a diffractive optical element for correcting the vision of a user, the diffractive optical element having a characteristic wavelength of operation, the characteristic wavelength of operation being from 450 nm to 510 nm.
the first liquid crystal cell comprising a cholesteric liquid crystal,
the first liquid crystal cell being operable between a first, unswitched state and a second, switched state, wherein in the first state, the difference in the effective refractive index of the liquid crystal and the refractive index of the diffractive optical element is greater or lower than in the second state.

The applicant has discovered that it is advantageous to use a diffractive optical element having a characteristic wavelength of operating lower than that which may typically be used for other lenses, such as lenses of spectacles.

The characteristic wavelength of operation may be, for example, no more than 560 nm, optionally no more than 550 nm, optionally no more than 540 nm, optionally no more than 530 nm, optionally no more than 520 nm, optionally no more than 510 nm, optionally no more than 500 nm, optionally no more than 490 nm and optionally no more than 480 nm. The applicant has discovered that it is possible to obtain a viable contact lens with a characteristic wavelength of operation of up to about 550 nm, because blue diffraction artefacts that could create problems at up to 550 nm in spectacles may not create problems for contact lenses.

The characteristic wavelength of operation may be, for example, at least 460 nm, optionally at least 470 nm and optionally at least 480 nm.

The characteristic wavelength of operation may be, for example, from 460 to 560 nm, optionally from 460 to 550 nm, optionally from 470 to 550 nm, optionally from 460 to 490 nm, optionally from 470 to 490 nm and optionally 480 nm.

Exemplary embodiments will now be described by way of example only with reference to FIGS. 1 to 9.

Figure 2:
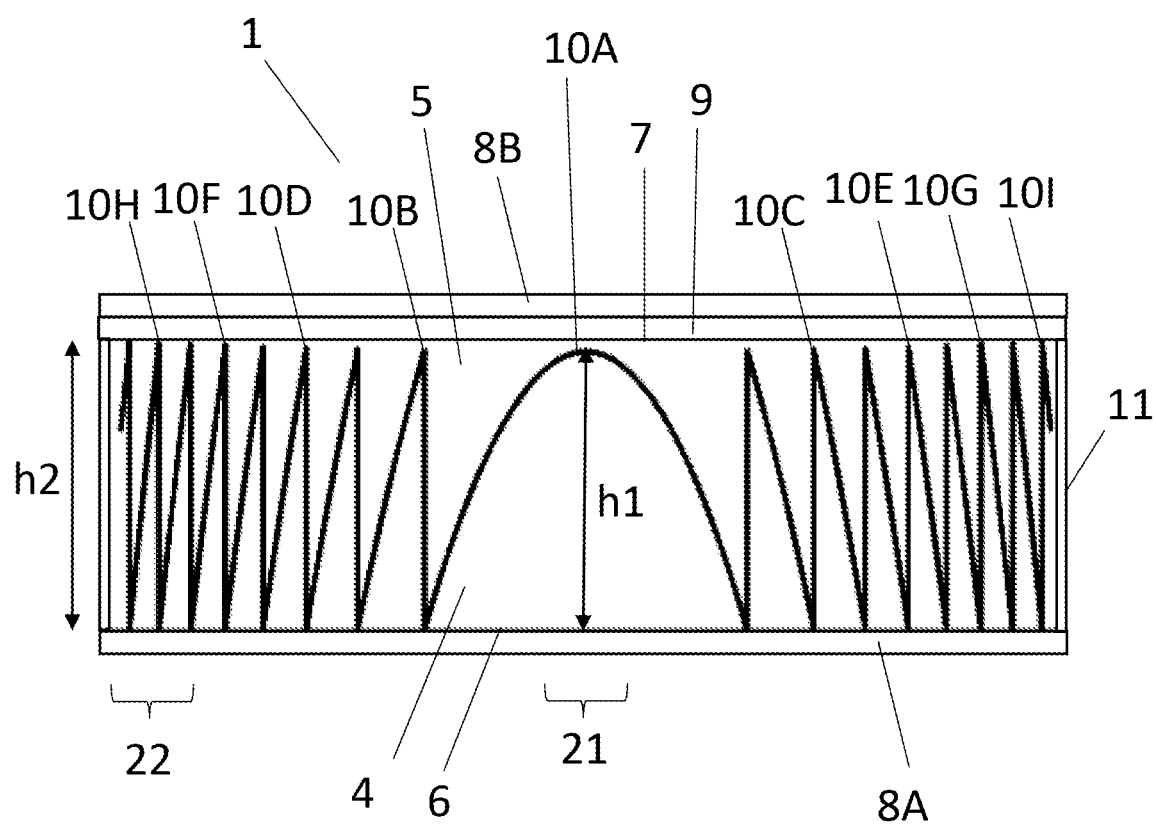
FIG. 2 shows a schematic side-on view of the liquid crystal cell used in FIG. 1.

An example of an electrically-switchable flexible contact lens in accordance with an embodiment of the first and second aspects of the present invention is shown in FIGS. 1 and 2. FIG. 1 is a schematic cross-sectional view of a contact lens that is denoted generally by reference numeral 1, and which comprises a flexible lens body 2 comprising any suitable material, such as silicone hydrogel materials, hydrogel materials free of silicone compounds, and silicone elastomer materials, into which has been incorporated a liquid crystal cell denoted generally by reference numeral 3. FIG. 2 is a cross-sectional view of part of contact lens 1. For the purpose of clarity and ease of illustration, the liquid crystal lens 3 is depicted in FIG. 2 as being flat/planar. Those skilled in the art will realise that this is not the case, the shape of the liquid crystal cell being more properly shown in FIG. 1. Liquid crystal cell 3 comprises a diffractive optical element 4 for correcting the vision of a user and a liquid crystal 5. Briefly, the liquid crystal is switchable between a first, unswitched state and a second, switched state. In one of the switched and unswitched states, the refractive index of the liquid crystal matches that of the diffractive optical element, and the diffractive optical element has a first focal power. In the other of the switched and unswitched states, the refractive index of the liquid crystal does not match the refractive index of the diffractive optical element, and the diffractive optical element has a second focal power, different from the first focal power.

Diffractive optical element 4 comprises a plurality of peaks and troughs, with a central peak 10A, and eight annular peaks 10B, C, D, E, F, G, H, I arranged concentrically around the central peak, providing nine diffractive zones (a zone being provided between each pair of adjacent peaks). The associated troughs have not been labelled for clarity. Such diffractive elements are known to those skilled in the art of optics. In known lenses, spacer beads or similar would be used to maintain the cell spacing between the first 6 and second 7 inner surfaces. In the present example, diffractive optical element 4 acts as a spacer to maintain the cell spacing between first 6 and second 7 inner surfaces. While FIG. 2 shows the central peak 10A not being in contact with the second inner surface, this is done merely to illustrate that the height of peak 10A is less than that of 10I, which is described in more detail below. A spacer 11 is provided around the perimeter of the liquid crystal cell 3, outward of the diffractive optical element 4. This spacer 11 is formed of beads having a diameter of about 4 microns dispersed in glue. The spacing between the first 6 and second 7 inner surfaces is approximately 4 microns, but the spacing is greater at an outer region 22 of liquid crystal cell 3 than at an inner region 21, the difference being about 5%, the difference being attributable to the difference in the maximum height of the diffractive optical element 4 at the inner portion 21 and the outer portion 22. The maximum height, h2, of the diffractive optical element 4 at the outer portion 22 is 4.0 microns, while the maximum height, h1, of the diffractive optical element 4 at the inner portion 21 is 3.85 microns. This difference in maximum height is small, but it improves optical performance. In particular, the applicant has discovered that such an arrangement of the diffractive optical element may compensate for the curvature of the cornea when the contact lens is placed on the cornea. Furthermore, such an arrangement of the diffractive optical element may help improve "straight ahead viewing", particularly at the edge of a lens comprising a diffractive optical element. The increased height of the diffractive optical element at the edge of the diffractive optical element ensures that the optical path at the edge is approximately the same as in the centre of the diffractive optical element. Such an arrangement of the diffractive optical element ensures that the wavelength of optimal optical performance is approximately the same across the width of the diffractive optical element. Without the increased height, the optical path at the edge of the diffractive optical element would be slightly shorter than in the centre of the diffractive optical element, which would be undesirable.

The height of the peaks 10A-I increases with distance from the centre of the diffractive optical element 4. The height of the peaks 10A-I may increase sub-linearly, linearly or super-linearly with distance from the centre of the diffractive optical element.

The diffractive optical element 4 is a spherical surface that is 'chopped up' so that the wavefronts passing through the diffractive optical element have a 2π phase shift across each zone boundary (acknowledging that the a shift strictly speaking only occurs at a single wavelength). It is anticipated that, instead of a simple spherical surface (giving a simple uniform spherical power over the area of the diffractive optical element), one could modify the shape of the diffractive optical element to have different optical powers across the area of the diffractive optical element. It may, for example, be possible to use oval diffractive optical elements for the treatment of astigmatism.

The diffractive optical element 4 maintains the spacing between the first 6 and second 7 inner surfaces, and it inhibits large reductions in the spacing as may occur when the lens 1 (and therefore the liquid crystal cell 3) is deformed, such as when the lens is placed on the cornea of a wearer. The cornea is typically aspherical, and placement of a contact lens on the cornea of a wearer causes the lens to deform. In the absence of a diffractive optical element 4 that acts as a spacer, large reductions in the spacing between the first 6 and second 7 inner surfaces may be observed for certain parts of the liquid crystal cell 3 should the contact lens 1 be placed on the eye of a wearer. Furthermore, maintaining the cell gap thickness also maintains a cell gap thickness that is small enough that the liquid crystal can align without haze.

The applicant has observed that in the event that if the peaks are not attached to inner surface 7, and the contact lens is deformed as it would be when placed onto a cornea of a user, liquid crystal may be moved from the space between peaks 10A and 10B, outwardly towards the outer part of the contact lens, creating a significant amount of excess liquid crystal between the diffractive optical element and inner surface 7, increasing the spacing between the first 6 and second 7 inner surfaces by up to 1 micron in the regions of peaks 10G, H and I. To help reduce displacement of the liquid crystal, at least one, optionally more than one and optionally each, of peaks 10A-I may be adhered to inner surface 7 using an adhesive. As an alternative to an adhesive it may be possible to attach peaks 10A-I to inner surface by melting, pressing and cooling of the polymer 9. Still further, the peaks may be attached by physical adhesion, such as by the use of a plasma treatment process and the like. However, adhering a peak or peaks to the inner surface 7 is not essential since the optical properties of the optic will not be significantly negatively impacted by liquid crystal displacement due to the diffractive element.

Figure 3:
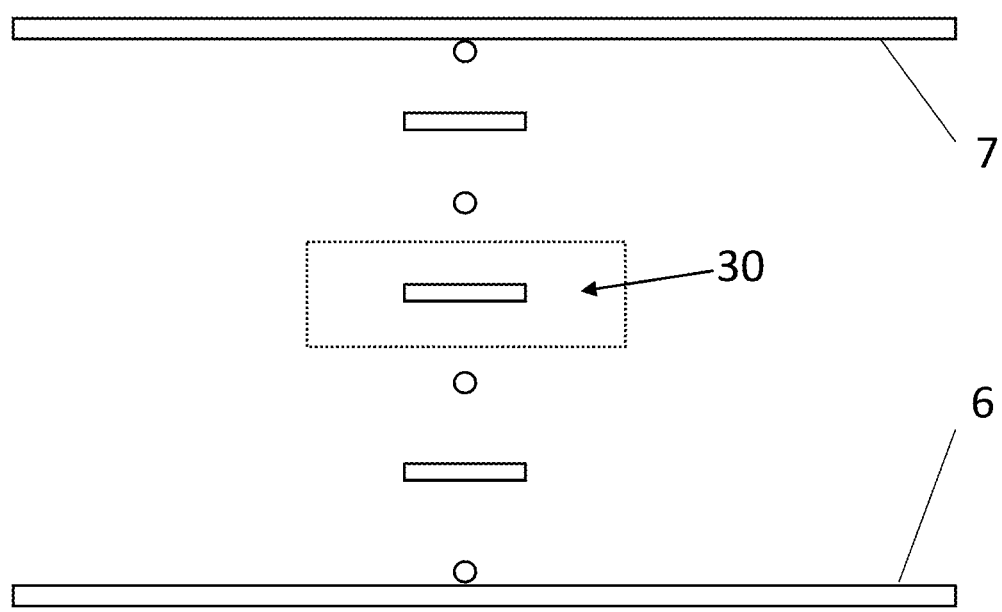
FIG. 3 shows a schematic representation of the local alignment of liquid crystal molecules in a liquid crystal cell in an unswitched state.

In the liquid crystal device 3, the liquid crystal is a cholesteric liquid crystal comprising a nematic liquid crystal that has been doped with a chiral dopant. Such nematic liquid crystals are well-known to those skilled in the art of liquid crystal science, and may comprise E7, BL037 and/or BL038, for example. Such chiral dopants are also well-known to those skilled in the art of liquid crystal science, such as Merck ZLI-3786, CB15 and S811. Local alignment of the molecules in the liquid crystal device 3 is shown schematically in FIG. 3. Referring to FIG. 2, inner surfaces 6 and 7 are formed of an alignment polymer that imparts alignment to liquid crystal molecules adjacent the rubber polymer. Such alignment of the liquid crystal molecules adjacent the alignment polymer imparts a particular orientation to the liquid crystal that is remote from the alignment polymer, dependent on the viscoelastic properties of the liquid crystal. Referring to FIG. 2, a layer of said polymer 9 is adjacent liquid crystal 5. The alignment polymer 9 in this case is a UV-cured polymer (Rolic ROP-103/2CP). The polymer is cured using suitably-polarised UV radiation so that it imparts a desired alignment on the liquid crystal adjacent the polymer. A similar UV-cured polymer layer is provided on top of the diffractive optical element 4, but is not shown. The alignment polymer layers are rubbed so that the director (the average direction of liquid crystal molecules) adjacent the rubber polymer layers may be approximately parallel to first 6 and second 7 inner surfaces, but tilted (a phenomenon known to those skilled in the art as "pre-tilt"), typically by a few degrees. (as shown by the small circles adjacent the first 6 and second 7 inner surfaces). The tilt of the director adjacent the first 6 and second 7 inner surfaces may be greater than a few degrees. For example, the tilt of the director adjacent the first 6 and second 7 inner surfaces may be 10-30 degrees. Between the first 6 and second 7 inner surfaces, the director of the liquid crystal 5 forms a helical structure. This is shown in FIG. 3. The rod shapes indicate the director of the liquid crystal is approximately parallel to the first 6 and second 7 inner surfaces, and in the plane of the figure. In this unswitched state, the effective refractive index of the liquid crystal is polarisation-independent, and is given by $n_{ave}=0.5(n_e+n_o)$ (Equation 1), where $n_e$ is the extraordinary refractive index and $n_o$ is the ordinary refractive index. Those skilled in the art will realise that it is desirable for the pitch of the liquid crystal to be no more than 500 nm (i.e., approx. the same, or less than, the wavelength of the incident light) in order that liquid crystal behaves, to a reasonable approximation, as a single refractive index material. The applicant has discovered that it is possible for the contact lens to operate satisfactorily if the liquid crystal has a higher pitch (say, 600-700 nm) without significant optical artefacts appearing. This may be beneficial because using a higher pitch may reduce switching voltage.

Figure 10:
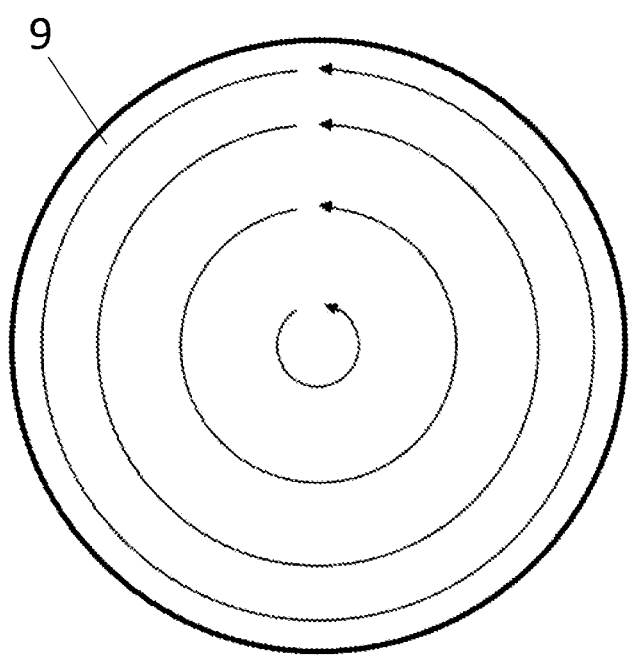
FIG. 10 shows a schematic plan view of the alignment of the director of liquid crystal adjacent an alignment polymer.

The alignment of the director of the liquid crystal adjacent the alignment polymer 9 is shown in FIG. 10, with the arrows indicating the direction of the director of the liquid crystal adjacent the alignment polymer. Such an alignment is used to provide polarisation-independent operation of the contact lens. The alignment of the director of the liquid crystal adjacent the polymer layer formed on the diffractive optical element 4 is essentially the same as that shown in FIG. 10.

The liquid crystal 5 and the material from which the diffractive optical element 4 is produced may be selected to achieve a desired optical result. For example, the liquid crystal and the material used to make the diffractive optical element may be selected so that the effective refractive index of the liquid crystal matches that of the material used to make the diffractive optical element, and in this case, the diffractive optical element does not make any contribution to the focal power of the lens. Alternatively, if the effective refractive index of the liquid crystal does not match that of the material used to make the diffractive optical element, the diffractive optical element does make a contribution to the focal power of the lens.

Figure 4:
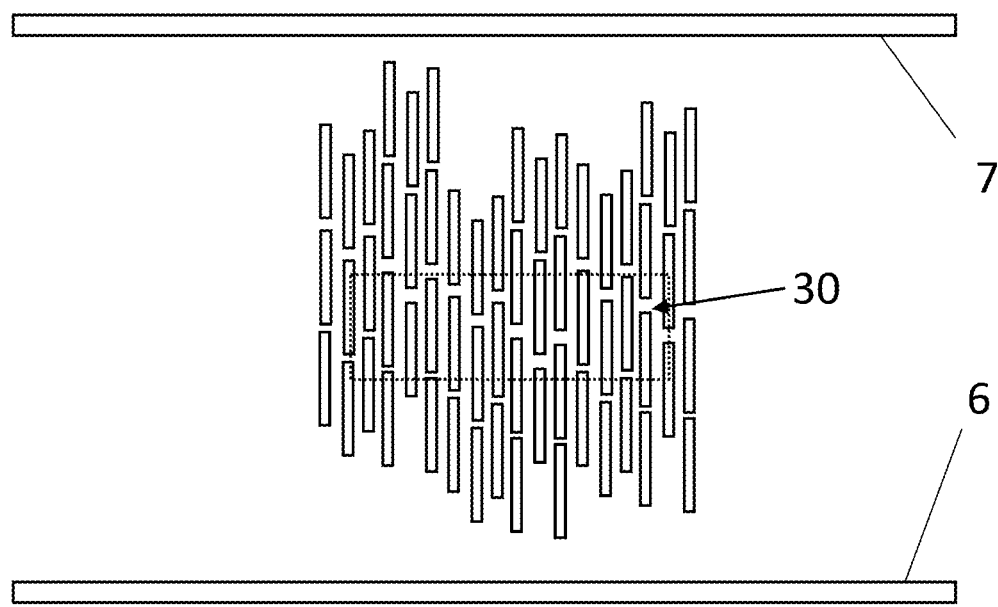
FIG. 4 shows a schematic representation of the local alignment of liquid crystal molecules in a liquid crystal cell in a switched state.

When a suitable voltage is applied to the electrodes (8A, 8B) of the liquid crystal cell, the liquid crystal molecules are switched into a homeotropic state shown schematically in FIG. 4, in which the director of the liquid crystal in the central portion 30 of the liquid crystal cell 3 is normal to the first 6 and second 7 inner surfaces. This realignment of the liquid crystals provides a different effective refractive index. In certain cases, when the liquid crystal is in a switched state, the effective refractive index of the liquid crystal may match the refractive index of the material used to make the diffractive optical element 4, in which case the diffractive optical element makes no contribution to the focal power of the lens. Conversely, when the liquid crystal is in a switched state, the effective refractive index of the liquid crystal may not match the refractive index of the material used to make the diffractive optical element 4, in which case the diffractive optical element makes a contribution to the focal power of the lens.

An example of an embodiment of a contact lens in accordance with the third aspect of the present invention will now be described with reference to FIGS. 1 and 2. The electrically-switchable flexible contact lens is denoted by reference numeral 1. The lens 1 comprises a liquid crystal cell 3 for changing a focal power of the contact lens. The liquid crystal cell 3 comprises a diffractive optical element 4 for correcting the vision of a user and a cholesteric liquid crystal 5. The liquid crystal cell 3 is operable between a switched state and an unswitched state. The diffractive optical element is made from MR10, and the diffractive optical element has a refractive index of 1.63. In the unswitched state, the effective refractive index of the liquid crystal and the diffractive optical element are matched, and therefore the diffractive optical element does not contribute to the focal power of the lens. The average refractive index of the liquid crystal is calculated in accordance with Equation 1 above. The average refractive index of the liquid crystal is effectively matched to the refractive index of the diffractive optical element at all visible wavelengths, i.e., from 450 to 700 nm. This matching of the refractive indices at all visible wavelengths provides improved optical performance, since the amount of diffraction observed from the diffractive optical element is minimised due to the matching of refractive indices across the visible spectrum. Those skilled in the art will realise that exact matching of the refractive indices across the entire visible spectrum is not required.

An example of an embodiment of a contact lens in accordance with the fourth aspect of the present invention will now be described with reference to FIGS. 1 and 2. The lens is denoted generally by reference numeral 1 and comprises a liquid crystal cell 3 for changing a focal power of the contact lens. The liquid crystal cell 3 comprises a diffractive optical element 4 for correcting the vision of a user, and a cholesteric liquid crystal 5. The lens is further provided with a +1 D bulge (not shown) on its upper surface. The liquid crystal cell 3 is operable between a first, unswitched state and a second, switched state. In the first state, the liquid crystal molecules are oriented as described above with reference to FIG. 3. The average refractive index of the liquid crystal is 1.63. The diffractive optical element 4 is made from Trivex and has a refractive index of 1.51. In the first, unswitched state, there is a mismatch between the refractive index of the liquid crystal and the diffractive optical element. This results in the diffractive optical element contributing to the focal power of the lens. The diffractive optical element contributes −1 D to the lens, and therefore the total power of the lens taking into account the contribution of the diffractive optical element 4 and the +1 D bulge is 0 D. This can be considered to be the distance vision state. In the second, switched state, the effective refractive index of the liquid crystal 5 is 1.51, and there is a match between the refractive index of the liquid crystal and the diffractive optical element. This results in the diffractive optical element not contributing to the focal power of the lens. The total power of the lens is therefore +1 D. This is the near vision state. In the event of a power failure, the contact lens defaults to distance vision, i.e., an optical power of 0 D.

Figure 5:
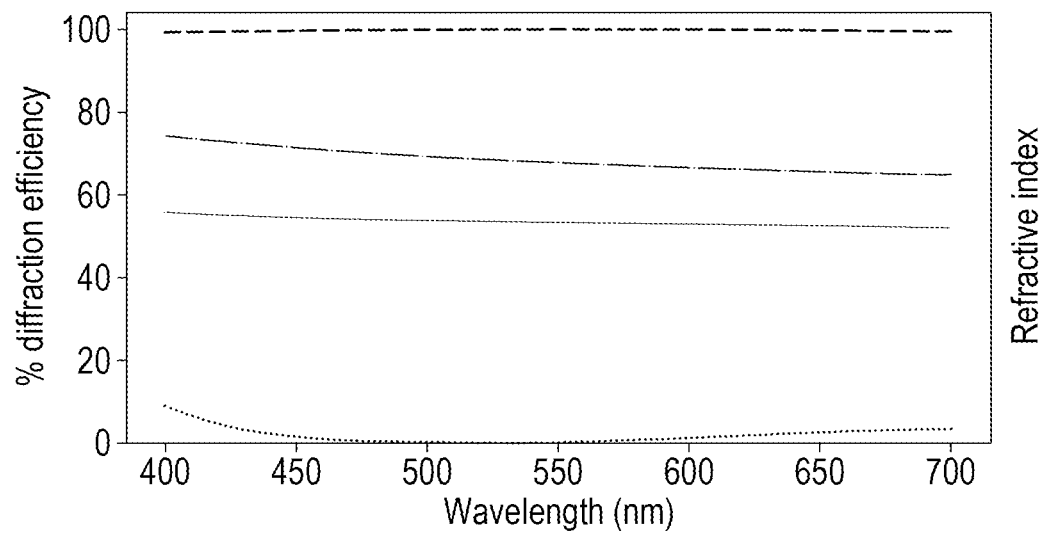
FIG. 5 shows the intensity of diffraction profiles produced by a lens comprising a liquid crystal cell in which the diffractive optical element has a low refractive index, the liquid crystal cell being in the switched state.

The applicant has discovered that it is possible to obtain excellent matching between the effective refractive index of the liquid crystal and the material that makes-up the diffractive optical element for all visible wavelengths of light when the liquid crystal cell has been switched into the second state. FIG. 5 shows that the effective refractive index of the liquid crystal ($n_o$) and the material that makes-up the diffractive optical element is substantially the same for all visible wavelengths of light when the liquid crystal cell is switched into the second state. In this connection, the solid line shows the effective refractive indices of the liquid crystal and the diffractive optical element. The effective refractive indices of the liquid crystal and the diffractive optical element are effectively the same from 400 nm to 700 nm. This excellent matching of the refractive indices results in the diffractive optical element not contributing to the optical power of the lens. Furthermore, FIG. 5 shows the intensity of the various order diffraction profiles observed from the diffractive optical element. In this connection, the dashed line shows the $0^{th}$ order diffraction profile, the chain line (long dashes separated by dots) shows the $1^{st}$ order diffraction profile and the dotted line shows the $2^{nd}$ order diffraction profile. Please note that the $1^{st}$ and $2^{nd}$ order diffraction profiles shown in FIG. 5 are shown multiplied by 100. It can be seen that virtually all of the light incident on the contact lens is transmitted, with very little light being diffracted, with very small $1^{st}$ and $2^{nd}$ order diffraction profiles at all wavelengths.

Figure 6:
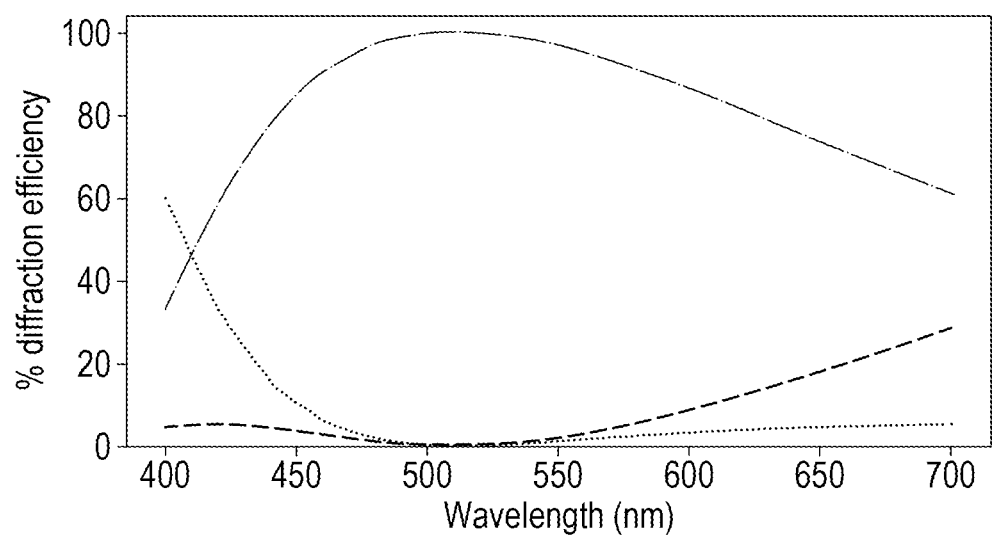
FIG. 6 shows the intensity of diffraction profiles produced by a lens comprising a liquid crystal cell in which the diffractive optical element has a low refractive index, the liquid crystal cell being in the unswitched state.

FIG. 6 shows the intensity of various diffraction peaks from the diffractive optical elements as a function of wavelength when the liquid crystal cell 3 is in the first, unswitched state. In this case, there is a mismatch between the effective refractive index of the liquid crystal and the diffractive optical element, and therefore the diffractive optical element contributes to the focal power of the lens. In this connection, the dashed line shows the $0^{th}$ order diffraction profile, the chain line (long dashes separated by dots) shows the $1^{st}$ order diffraction profile and the dotted line shows the $2^{nd}$ order diffraction profile. FIG. 6 shows that there is some wavelength dependence, but the optical performance of the lens is still good. Surprisingly, the applicant has found that despite there being some wavelength dependence of the optical response of the contact lens, lateral rainbow effects that would be observed in spectacles are not observed in contact lenses. The applicant has therefore demonstrated that it is possible to obtain a lens with good optical properties using a diffractive optical element with a relatively low refractive index (i.e., no more than 1.57).

An example of an embodiment of a contact lens in accordance with the fifth aspect of the present invention will now be described with reference to FIGS. 1 and 2. The lens is denoted generally by reference numeral 1 and comprises a liquid crystal cell 3 for changing a focal power of the contact lens. The liquid crystal cell 3 comprises a diffractive optical element 4 for correcting the vision of a user, and a cholesteric liquid crystal 5. The liquid crystal cell 3 is operable between a first, unswitched state and a second, switched state, wherein in the first state, the difference in the refractive index of the liquid crystal and the diffractive optical element is less than in the second state. The refractive index of the diffractive optical element is 1.63. In the first, unswitched state, the effective refractive index of the liquid crystal 5 is 1.63, and there is a match between the refractive index of the liquid crystal and the diffractive optical element. This results in the diffractive optical element not contributing to the focal power of the lens. The total power of the lens is therefore 0 D. This can be considered to be the distance vision state. In the second, switched state, the effective refractive index of the liquid crystal 5 is 1.51, and there is a mismatch between the refractive index of the liquid crystal and the diffractive optical element. This results in the diffractive optical element contributing to the focal power of the lens. The total power of the lens is therefore +1 D. This can be considered to be the near or close vision state. In the event of a power failure, the contact lens defaults to distance vision, i.e., an optical power of 0 D.

Figure 7:
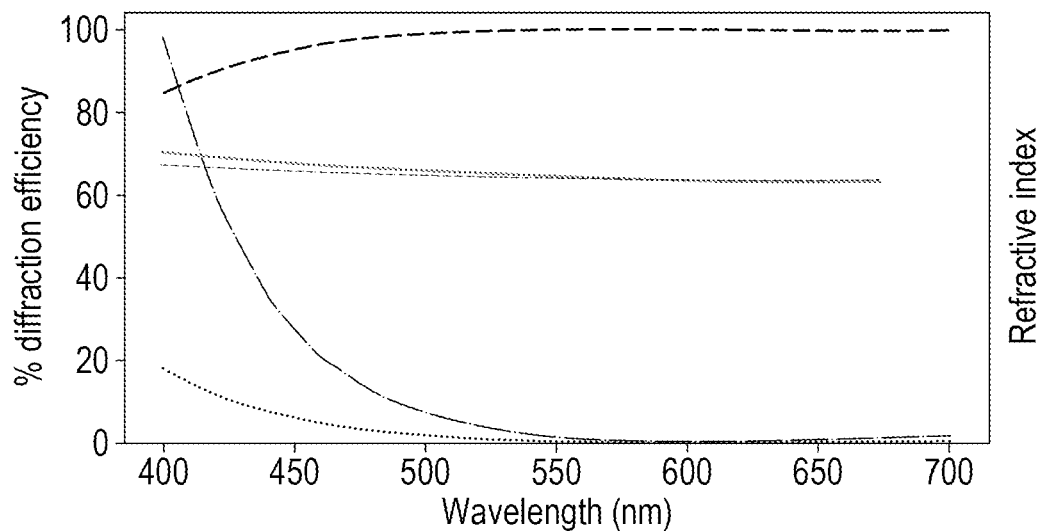
FIG. 7 shows the intensity of diffraction profiles produced by a lens comprising a liquid crystal cell in which the diffractive optical element has a high refractive index, the liquid crystal cell being in the unswitched state.

The applicant has discovered that it is possible to obtain good matching between the effective refractive index of the liquid crystal and the material that makes-up the diffractive optical element for all visible wavelengths of light when the liquid crystal cell is in the first, unswitched state, with only a small difference between the refractive indices at lower wavelengths (sub-500 nm). In this connection, the refractive index of the liquid crystal is shown as a solid line, and the refractive index of the diffractive optical element is shown as the unemboldened dashed line immediately adjacent to the solid line. This excellent matching of the refractive indices results in the diffractive optical element not contributing significantly to the optical power of the lens. FIG. 7 shows the intensity of the various order diffraction profiles observed from the diffractive optical element. In this connection, the emboldened dashed line shows the $0^{th}$ order diffraction profile, the chain line (long dashes separated by dots) shows the $1^{st}$ order diffraction profile and the dotted line shows the $2^{nd}$ order diffraction profile. The $1^{st}$ order and $2^{nd}$ order diffraction profiles shown in FIG. 7 are shown multiplied by 10. It can be seen that virtually all of the light incident on the contact lens is transmitted, with very little light being diffracted, with very small $1^{st}$ and $2^{nd}$ order diffraction profiles at all wavelengths.

Figure 8:
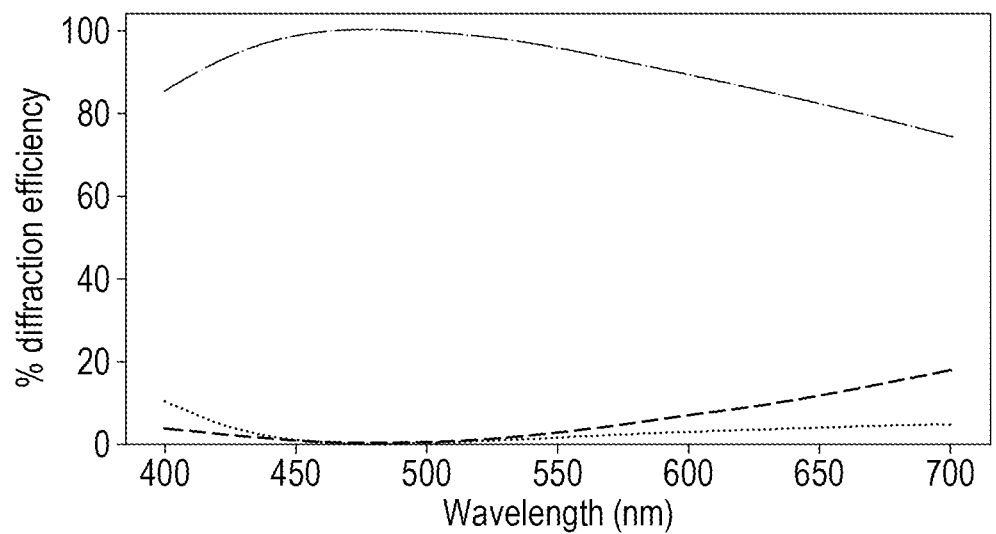
FIG. 8 shows the intensity of diffraction profiles produced by a lens comprising a liquid crystal cell in which the diffractive optical element has a high refractive index, the liquid crystal cell being in the switched state.

FIG. 8 shows the intensity of various diffraction peaks from the diffractive optical elements as a function of wavelength when the liquid crystal cell 3 is in the second, switched state. In this case, there is a mismatch between the effective refractive index of the liquid crystal and the diffractive optical element, and therefore the diffractive optical element contributes to the focal power of the lens. In this connection, the emboldened dashed line shows the $0^{th}$ order diffraction profile, the chain line (long dashes separated by dots) shows the $1^{st}$ order diffraction profile and the dotted line shows the $2^{nd}$ order diffraction profile. FIG. 8 shows that there is very little wavelength dependence, and the optical performance of the lens is still good. The applicant has therefore demonstrated that it is possible to obtain a lens with good optical properties using a diffractive optical element with a relatively high refractive index (i.e., at least 1.58). Surprisingly, the applicant has found that despite there being some wavelength dependence of the optical response of the contact lens, lateral rainbow effects that would be observed in spectacles are not observed in contact lenses.

The exemplary contact lenses described above provide unexpectedly good peripheral imaging performance. In this connection, one may expect light to be incident on the diffractive optical element from a wide range of angles, and that such a wide variation in incident angles and the curvature of the cornea to lead to a large variation in optical path lengths through the diffractive optical element, leading to poor optical performance. However, the applicant has discovered that peripheral light entering the contact lens and making its way through the pupil goes through a part of the diffractive optical element that is approximately normal to the incoming light i.e., the light is approximately from the same direction, and there is little variation in the angle of incidence. This leads to good peripheral imaging performance.

Furthermore, as the angle of incidence of light increases from the normal, the amount of light passing through the diffractive optical element decreases. At some angle, essentially no light will pass through the diffractive optical element, and no optical artefacts will be seen. For example, for light at ~53° incidence and a 5 mm pupil size approximately half of a detected ray bundle is incident on the diffractive optical element, and the other half goes through the non-diffractive region of the contact lens. For light at higher angles of incidence, the effective area of the diffractive optical element that is exposed to light is reduced even further so that optical artefacts become negligible as the ray bundle moves out of the diffractive region entirely. There is therefore no abrupt start/stop of the diffractive region as far as the user is concerned, just a smoothly varying amplitude of contribution. For a spectacle lens implementation, it looks a like sharp jump between looking through the diffractive optical element and not looking through the diffractive optical element.

The applicant has also discovered that astigmatism of peripheral light induced by incident light passing through the diffractive optical element at a non-normal angle is acceptable (averaging about 0.3 D).

An example of an embodiment of a flexible contact lens in accordance with a seventh aspect of the present invention will now be described with reference to FIG. 1. The lens is essentially that described above in relation to the fifth aspect of the present invention. The lens is denoted generally by reference numeral 1, and it comprises a liquid crystal cell 3 for changing a focal power of the contact lens, and having a cell gap thickness between a first inner surface and a second inner surface. The liquid crystal cell 3 comprises a diffractive optical element 4 for correcting the vision of a user, and a cholesteric liquid crystal 5. The liquid crystal cell 3 is operable between a first state and a second state, wherein in the first state, the difference in the effective refractive index of the liquid crystal and the diffractive optical element is greater than in the second state. The liquid crystal cell and diffractive optical element have a characteristic wavelength of operation, the characteristic wavelength of operation being from 450 nm to 510 nm. The characteristic wavelength of operation is a wavelength at which one or more property of the lens is optimised. For example, the one or more property may comprise transmission of the lens when the liquid crystal cell is in a state in which the effective refractive index of the liquid crystal matches that of the diffractive optical element, or in a state in which the effective refractive index of the liquid crystal does not match that of the diffractive optical element. FIG. 8 demonstrates how a property of a contact lens may be optimised at 480 nm. Those skilled in the art will realise that other optical properties may be optimised at 480 nm or thereabouts. Those skilled in the art will realise that optimisation may be determined by changing the liquid crystal, for example, in order to change the refractive index of the liquid crystal, or the cell spacing between the first and second inner surfaces.

The effective refractive index of the liquid crystal depends on the orientation of the molecules of the liquid crystal. For example, in the unswitched state, the effective refractive index of the liquid crystal is the average refractive index, calculated by Equation 1, as noted above. In the switched state, the effective refractive index of the liquid crystal is $n_o$.

Figure 9:
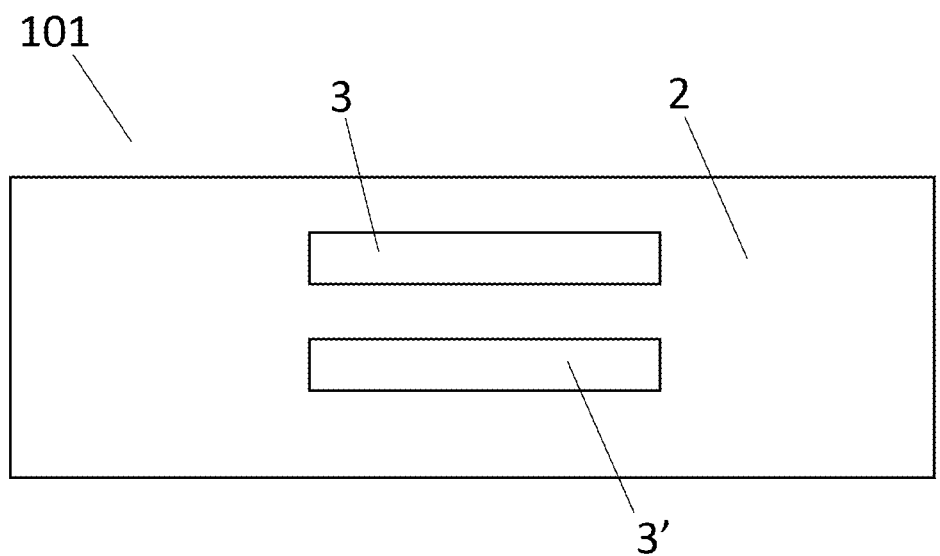
FIG. 9 shows a schematic cross-sectional view of an example of a contact lens in accordance with various aspects of the present invention, the contact lens comprising two liquid crystal cells.

The contact lenses of all of the aspects of the present invention may comprise more than one liquid crystal cell, as will now be described with reference to FIG. 9. An example of a contact lens in accordance with a first aspect of the present invention is denoted generally by reference numeral 101. The lens 101 comprises first 3 and second 3' liquid crystal cells provided in a lens body 2. First liquid crystal cell 3 is substantially as described above in relation to the contact lens of the first aspect of the present invention. Second liquid crystal cell 3' is substantially the same as first liquid crystal cell 3. Those skilled in the art will realise that this need not be the case.

Those skilled in the art will realise that the lens of the present invention may comprise diffractive optical elements different from those described above. In this connection, the number of diffraction zones is directly proportional to the optical power of the diffractive lens (in Diopters), and also proportional to the square of the diameter of the diffractive optical element. Therefore, the smaller the diffractive optical element, the fewer diffraction zones that are needed to produce a given optical power. Table 1 below shows the number of diffraction zones needed to produce a given focal power for a given diameter of diffractive optical element.

TABLE 1 number of diffraction zones needed to achieve a certain focal power for a given diameter of diffractive optical element

| Diameter of diffractive optical element | Focal power (Diopter) | | |
|---|---|---|---|
| | 1 | 2 | 3 |
| 6 | 8 | 16 | 24 |
| 4 | 4 | 9 | 14 |
| 3 | 2 | 4 | 6 |

It will of, course, be appreciated that features described in relation to one aspect of the present invention may be incorporated into other aspects of the present invention. For example, the method of the invention may incorporate any of the features described with reference to the apparatus of the invention and vice versa.

Further aspects of the present invention will now be described with reference to the following clauses:

Clause A1—An electrically-switchable flexible contact lens for conforming to an eye of a user, the lens comprising:

a first liquid crystal cell for changing a focal power of the ophthalmic lens, and having a cell gap thickness between a first inner surface and a second inner surface, the first liquid crystal cell comprising a diffractive optical element for correcting the vision of a user, wherein the diffractive optical element is arranged to maintain the cell gap thickness by providing support at one or more locations within the first liquid crystal cell.

Clause A2—The lens of clause A1, comprising a perimeter spacer provided at the perimeter of the first liquid crystal cell for maintaining the cell gap thickness in addition to the diffractive optical element.

Clause A3—The lens of clause A1 or A2, wherein the first liquid crystal cell comprises a cholesteric liquid crystal, and the first liquid crystal cell is operable between a first, unswitched state and a second, switched state, wherein in one of the first and second states, the difference in the effective refractive index of the liquid crystal and the refractive index of the diffractive optical element is greater than in the other of the first and second states.

Clause A4—The lens of clause A3, wherein in the other of the first and second states, the difference in the effective refractive index of the liquid crystal and the refractive index of the diffractive optical element is approximately nil.

Clause A5—The lens of any of clauses A1 to A4, wherein the diffractive optical element comprises an inner portion and an outer portion, a height of the diffractive optical element at the outer portion being greater than the height of the diffractive optical element at the inner portion.

Clause A6—The lens of any of clauses A1 to A5, wherein at least a portion of the diffractive optical element is attached to the first inner surface and at least a portion of the diffractive optical element may be attached to the second inner surface.

Clause A7—The lens of any of clauses A1 to A6, wherein at both 450 nm and 700 nm, the average refractive index of the liquid crystal is 0.80 to 1.20 times the refractive index of the diffractive optical element, the average refractive index being $n_{ave}=0.5(n_e+n_o)$,
where $n_e$ is the extraordinary refractive index and $n_o$ is the ordinary refractive index.

Clause A8—The lens of clause A7, wherein at both 450 nm and 700 nm, said average refractive index of the liquid crystal is 0.95 to 1.05 times the refractive index of the diffractive optical element.

Clause B1—An electrically-switchable flexible contact lens for conforming to an eye of a user, the lens comprising:
A first liquid crystal cell for changing a focal power of the contact lens, and having a cell gap thickness between a first inner surface and a second inner surface;
the first liquid crystal cell comprising a diffractive optical element for correcting the vision of a user, the diffractive optical element comprising an inner portion and an outer portion, the height of the diffractive optical element at the outer portion being from 1% to 20% greater than the height of the diffractive optical element at the inner portion.

Clause B2—The lens of clause B1, wherein the height of the diffractive optical element at the outer portion is at least 3% greater and up to 15% greater than the height of the diffractive optical element at the inner portion.

Clause B3—The lens of clause B1 or B2, wherein the diffractive optical element comprises a plurality of peaks and troughs, and the outer portion comprises an outer peak, optionally the outermost peak.

Clause B4—The lens of any of clauses B1 to B3, wherein the diffractive optical element extends over a chord length, r, the inner portion comprises the portion of diffractive optical element within a cord length of r/8 from a centre of the diffractive optical element, and the outer portion comprises the portion of diffractive optical element having a chord length of from 3 r/8 to r/2.

Clause B5—The lens of any of clauses B1 to B4, wherein the liquid crystal comprises a cholesteric liquid crystal, and optionally, in an unswitched state, a director of the liquid crystal may at an angle of no more than 5 degrees to the first and second inner surfaces, and in a switched stated, a director of the liquid crystal may be at an angle of at least 60 degrees, optionally at least 70 degrees, optionally at least 80 degrees and optionally at least 85 degrees to the first and second inner surfaces.

Clause C1—An electrically-switchable flexible contact lens for conforming to an eye of a user, the lens comprising:
 a first liquid crystal cell for changing a focal power of the contact lens, and having a cell gap thickness between a first inner surface and a second inner surface,
 the first liquid crystal cell comprising a diffractive optical element for correcting the vision of a user, and a cholesteric liquid crystal,
 the first liquid crystal cell being operable between a first, unswitched state and a second, switched state, wherein in the first state, the difference in the effective refractive index of the liquid crystal and the refractive index of the diffractive optical element is greater or lower than in the second state,
 wherein at both 450 nm and 700 nm, the average refractive index of the liquid crystal is 0.80 to 1.20 times the refractive index of the diffractive optical element, the average refractive index of the liquid crystal being $n_{ave}$, calculated thus $n_{ave}=0.5(n_e+n_o)$:
 where $n_e$ is the extraordinary refractive index and $n_o$ is the ordinary refractive index.

Clause C2—A lens according to clause C1, wherein at both 450 nm and 700 nm, said refractive index of the liquid crystal is from 0.90 to 1.10 times the refractive index of the diffractive optical element.

Clause C3—A lens according to clause C1 or C2 wherein at both 450 nm and 700 nm, said refractive index of the liquid crystal is from 0.95 to 1.05 times the refractive index of the diffractive optical element.

Clause C4—A lens according to any of clauses C1 to C3, wherein the said refractive index of the liquid crystal at 500 nm is 0.95 to 1.05 times the refractive index of the diffractive optical element.

Clause D1—An electrically-switchable flexible contact lens for conforming to an eye of a user, the lens comprising:
 a first liquid crystal cell for changing a focal power of the contact lens, and having a cell gap thickness between a first inner surface and a second inner surface,
 the first liquid crystal cell comprising a diffractive optical element for correcting the vision of a user, and a cholesteric liquid crystal,
 the first liquid crystal cell being operable between a first, unswitched state and a second, switched state, wherein in the first state, the difference in the effective refractive index of the liquid crystal and the refractive index of the diffractive optical element is greater or less than in the second state,
 wherein the refractive index of the diffractive optical element is no more than 1.57.

Clause E1—An electrically-switchable flexible contact lens for conforming to an eye of a user, the lens comprising:
 A first liquid crystal cell for changing a focal power of the contact lens, and having a cell gap thickness between a first inner surface and a second inner surface,
 the first liquid crystal cell comprising a diffractive optical element for correcting the vision of a user, and cholesteric liquid crystal,
 the first liquid crystal cell being operable between a first, unswitched state and a second, switched state, wherein in the first state, the difference in the effective refractive index of the liquid crystal and the refractive index of the diffractive optical element is greater or less than in the second state, wherein the refractive index of the diffractive optical element is at least 1.58.

Clause F1—An electrically-switchable flexible contact lens for conforming to an eye of a user, the lens comprising:
  a first liquid crystal cell for changing a focal power of the ophthalmic lens, and having a cell gap thickness between a first inner surface and a second inner surface,
  the first liquid crystal cell comprising a diffractive optical element for correcting the vision of a user,
  the diffractive optical element comprising a plurality of peak and troughs, the peaks extending in a direction from the first inner surface to the second inner surface,
  at least a portion of at least one peak being attached to the second inner surface.

Clause F2—A lens according to clause F1, wherein the diffractive optical element comprises a central peak and a plurality of outer peaks, at least a portion of at least one of the outer peaks being attached to the second inner surface.

Clause F3—A lens according to clause F2, wherein at least one, optionally more than one and optionally each of the outer peaks is annular.

Clause F4—A lens according to any of clauses F1 to F3, at least a majority of, and optionally substantially the entire perimeter of, at least one peak is attached to the second inner surface.

Clause G1—An electrically-switchable flexible contact lens for conforming to an eye of a user, the lens comprising:
  A first liquid crystal cell for changing at least one optical characteristic of the contact lens, and having a cell gap thickness between a first inner surface and a second inner surface,
  the first liquid crystal cell comprising a diffractive optical element for correcting the vision of a user, the diffractive optical element having a characteristic wavelength of operation, the characteristic wavelength of operation being from 450 nm to 510 nm;
  the first liquid crystal cell comprising a cholesteric liquid crystal,
  the first liquid crystal cell being operable between a first, unswitched state and a second, switched state, wherein in the first state, the difference in the effective refractive index of the liquid crystal and the refractive index of the diffractive optical element is greater or less than in the second state.

Clause G2—The lens according to clause H1 wherein the characteristic wavelength of operation is from 460 to 490 nm, optionally from 470 to 490 nm and optionally 480 nm.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The use of a diffractive optical element is not limited to liquid crystal cells comprising a cholesteric liquid crystal. For example, other types of liquid crystal could be used including undoped nematic and smectic liquid crystals.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An electrically-switchable flexible contact lens for conforming to an eye of a user, the lens comprising:
  a first liquid crystal cell for changing a focal power of the contact lens, and having a cell gap thickness between a first inner surface and a second inner surface,
  the first liquid crystal cell comprising a diffractive optical element for correcting the vision of a user,
  wherein the diffractive optical element is arranged to maintain the cell gap thickness by providing support at one or more locations within the cell, and
  the diffractive optical element comprises an inner portion and an outer portion, a maximum height of the diffractive optical element at the outer portion being greater than a maximum height of the diffractive optical element at the inner portion such that the diffractive optical element at the outer portion provides support to and spaces the first inner surface and the second inner surface at a greater distance at an outer region of the first liquid crystal cell than an inner region of the first liquid crystal cell.

2. The electrically-switchable flexible contact lens of claim 1, further comprising a perimeter spacer provided at the perimeter of the first liquid crystal cell for maintaining the cell gap thickness in addition to the diffractive optical element.

3. The electrically-switchable flexible contact lens of claim 1, wherein the first liquid crystal cell comprises a cholesteric liquid crystal, and the first liquid crystal cell is operable between a first, unswitched state and a second, switched state, wherein in one of the first and second states, the difference in the effective refractive index of the liquid crystal and the refractive index of the diffractive optical element is greater than in the other of the first and second states.

4. The electrically-switchable flexible contact lens of claim 3, wherein in the other of the first and second states, the difference in the effective refractive index of the liquid crystal and the refractive index of the diffractive optical element is approximately nil.

5. The electrically-switchable flexible contact lens of claim 1, wherein at least a portion of the diffractive optical element is attached to the first inner surface and at least a portion of the diffractive optical element may be attached to the second inner surface.

6. The electrically-switchable flexible contact lens of claim 1, wherein at both 450 nm and 700 nm, the average refractive index of the liquid crystal is 0.80 to 1.20 times the refractive index of the diffractive optical element, the average refractive index being $n_{ave}=0.5(n_e+n_o)$, where $n_e$ is the extraordinary refractive index and $n_o$ is the ordinary refractive index.

7. The electrically-switchable flexible contact lens of claim 6, wherein at both 450 nm and 700 nm, said average refractive index of the liquid crystal is 0.95 to 1.05 times the refractive index of the diffractive optical element.

8. The electrically-switchable flexible contact lens of claim 1 further comprising a second liquid crystal cell for changing a focal power of the contact lens, the second liquid crystal cell optionally comprising the features of the first liquid crystal cell.

9. The electrically-switchable flexible contact lens of claim 1, wherein the maximum height of the diffractive optical element at the outer portion is from 1% to 20% greater than the maximum height of the diffractive optical element at the inner portion.

10. The electrically-switchable flexible contact lens of claim 9, wherein the maximum height of the diffractive optical element at the outer portion is at least 3% greater and up to 15% greater than the maximum height of the diffractive optical element at the inner portion.

11. The electrically-switchable flexible contact lens of claim 10, wherein the liquid crystal comprises a cholesteric liquid crystal, and optionally, in an unswitched state, a director of the liquid crystal may be at an angle of no more than 5 degrees to the first and second inner surfaces, and in a switched stated, a director of the liquid crystal may be at an angle of at least 60 degrees, optionally at least 70 degrees, optionally at least 80 degrees and optionally at least 85 degrees to the first and second inner surfaces.

12. The electrically-switchable flexible contact lens of claim 9, wherein the diffractive optical element comprises a plurality of peaks and troughs, and the outer portion comprises an outer peak, optionally the outermost peak.

13. The electrically-switchable flexible contact lens of claim 9, wherein the diffractive optical element extends over a chord length, r, the inner portion comprises the portion of diffractive optical element within a cord length of r/8 from a centre of the diffractive optical element, and the outer portion comprises the portion of diffractive optical element having a chord length of from 3 r/8 to r/2.

* * * * *